United States Patent Office
3,077,483
Patented Feb. 12, 1963

3,077,483
[2,3]-CYCLOHEX-4'-EN-3'-ONE DERIVATIVES OF 17β-HYDROXY-ANDROSTANES
Fred A. Kincl, Mexico City, Mexico, assignor, by mesne assignments, to Syntex Corporation, a corporation of Panama
No Drawing. Filed June 8, 1960, Ser. No. 34,634
Claims priority, application Mexico Oct. 20, 1959
8 Claims. (Cl. 260—397.4)

The present invention relates to novel cyclopentanophenanthrene compounds and to a novel process for the production thereof.

More specifically it relates to novel andostranes, with or without a double bond at C-4,5, having a hydroxyl or acyloxy group at C-17β, an aliphatic hydrocarbon group at C-17α and a cyclohexen(4)-one(3) ring fused by its C-3 and C-4 carbons to the androstane nucleus at C-2 and C-3.

The novel compounds of the present invention can be represented by the following formula:

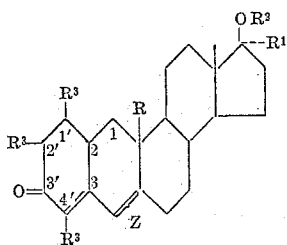

In the above formula, Z indicates a single or double bond; R represents hydrogen or methyl; R' represents hydrogen or an aliphatic hydrocarbon radical, saturated or unsaturated, containing up to 8 carbon atoms; and $R^2$ represents hydrogen or an acyl group derived from a hydrocarbon carboxylic acid containing up to 12 carbon atoms, saturated or unsaturated, of straight chain or branched chain aliphatic, cyclic, cyclic-aliphatic, aromatic and which may be substituted by functional groups such as hydroxyl, acyloxy of up to 12 carbon atoms, alkoxy of up to 8 carbon atoms, amino, nitro or halogen. Typical hydrocarbon radicals at C-17α are the methyl, ethyl, propyl, butyl, vinyl, propen(1)yl, buten(1)yl, ethinyl and buten(2)yl; typical acyl groups at C-17β are those derived from acetic, propionic, isobutyric, hexanoic, succinic, benzoic, trimethylacetic, aminoacetic, phenoxyacetic, cyclopentylpropionic and β-chloropropionic acids. $R^3$ represents hydrogen or a lower alkyl group.

The novel compounds of the present invention which may be considered as cyclopentanoperhydrobenzanthracene derivatives, exhibit anabolic activity together with a minimum of androgenic activity as well as exhibit anti-gonadotrophic activity and anti-estrogenic activity.

These compounds are further useful for relief of radiation nausea, treatment of osteoporosis, reduction of the incidence of dental caries, and therapy involving debilitating diseases.

The following equation illustrates in part a method for the preparation of the novel compounds:

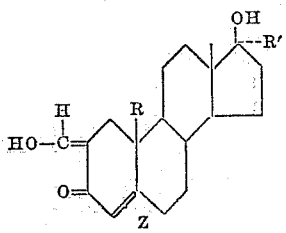

methyl-vinyl ketone
⎯⎯⎯⎯⎯⎯⎯→
amine

In the above equation, Z, R and R' have the same meaning as previously set forth.

In practicing the process above outlined, a 2-hydroxymethylene-dihydroallotestosterone or a 2-hydroxymethylene-testosterone, with or without an aliphatic hydrocarbon substituent at C-17α, or the 19-nor derivatives of the foregoing, disclosed by Ringold et al. in J. Am. Chem. Soc. 81, 427 (1959), and in copending applications Serial No. 3,746, filed January 21, 1960, and Serial No. 3,748, filed January 21, 1960, which in turn are continuations-in-part of earlier filed aplications as set forth therein, is condensed with a methyl vinyl ketone in the presence of small amounts of a tertiary amine, such as triethylamine, and then subjected to an alkaline treatment. Alternatively the methyl vinyl ketone may be prepared in situ, as for example, the reaction is effected with 4-diethylaminobutanone(2) and sodamide in absolute ethanol or with 4-chlorobutanone(2) in n-propyl alcohol in the presence of sodium n-propylate. The methyl-vinyl ketone may be substituted by lower alkyl substituents. Thus ketones such as 3-penten-2-one, 1-hexen-3-one, 1-penten-3-one, 2-methyl-1-buten-3-one and 2-ethyl-1-buten-3-one may be condensed with the 2-hydroxymethylene compounds to afford the novel compounds of the present invention containing alkyl substituents in the cyclohexenone moiety. For example, ketones of the following types, $CH_3—CO—CH=CH—R^4$; $R^4—CH_2—CO—CH=CH_2$ and $CH_3—CO—C(CH_3)=CH_2$, wherein $R^4$ is lower alkyl, form the following derivatives, respectively:

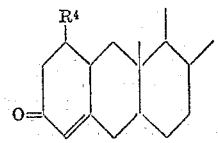

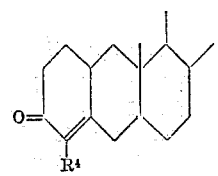

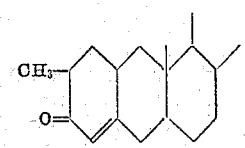

The formation of the disubstituted and trisubstituted compounds are obtained when ketones such as 3-methyl-3-penten-2-one, 2-hexen-4-one, 2-methyl-1-penten-3-one or 3-methyl-2-hexen-4-one are employed, which compounds may be illustrated, respectively, by the following diagrams:

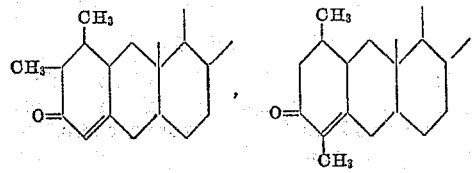

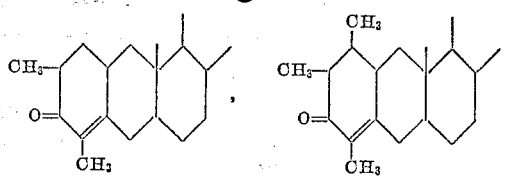

The following examples serve to illustrate but are not intended to limit the scope of the present invention:

*Example I*

A mixture of 5 g. of 2-hydroxymethylene-dihydroallotosterone and 800 mg. of dry and recently distilled methylvinylketone was cooled to 0° C. and treated with 5 drops of triethylamine; the mixture was kept at 0° C. for 1 hour and then at room temperature for 3 days. It was then diluted with ether and repeatedly washed with 5% aqueous sodium hydroxide solution to remove the unreacted hydroxymethylene compound in the form of its sodium salt. The ether was evaporated and the residue was dissolved in 400 cc. of aqueous methanol (50:50) containing 4 g. of sodium hydroxide; after refluxing for 8 hours, the cooled mixture was diluted with water and extracted with ether. The extract was consecutively washed with dilute hydrochloric acid, saturated aqueous sodium bicarbonate solution and finally with water, dried over anhydrous sodium sulfate and the ether was evaporated. The residue crystallized from methanol to produce 17β - hydroxy-androstane - [2,3]-cyclohex-4'-en-3'-one, namely the derivative of dihydroallotestosterone sharing its carbon atoms 2 and 3 with the carbon atoms 5 and 6 of a cyclohexanone.

*Example II*

A mixture of 8.64 g. of 2-hydroxymethylene-dihydroallotestosterone, 600 mg. of sodamide and 100 cc. of dry ether was stirred under an atmosphere of nitrogen at room temperature for two and a half hours; there was then added 4.3 g. of 4-diethylaminobutanone-(2)-methiodide in 2 cc. of absolute ethanol and the mixture was stirred for 3 hours at room temperature and then refluxed for 3 hours. The cooled mixture was poured into ice water, acidified with aqueous hydrochloric acid and extracted several times with ether. The extract was washed with water to neutral, dried over anhydrous sodium sulfate and the ether was evaporated. The residue was crystallized from methanol, thus yielding a compound having identical properties with those of the final compound of the preceding example.

*Example III*

To a solution of 250 mg. of sodium metal in 40 cc. of n-propanol was added 2.9 g. of 2-hydroxymethylene-dihydroallotestosterone, cooled to 0° C. and treated with 1 molar equivalent of 4-chloro-butan-2-one over a period of half an hour and taking care that the temperature did not rise over 0° C., under continuous stirring. The mixture was then kept at 0° C. for 18 hours, at the end of which it was diluted with water and extracted with ether. The extract was washed with water, dried over anhydrous sodium sulfate and evaporated. Crystallization of the residue from methanol furnished a compound identical with that produced in accordance with Example I.

*Example IV*

The methods of the preceding examples were applied to 2-hydroxy-methylene-testosterone, to produce 17β-hydroxy-Δ⁴-androstene-[2,3]-cyclohex-4'-en-3'-one.

*Example V*

In accordance with the method of Example I, 2-hydroxymethylene-17α-methyl-dihydroallotestosterone was converted into 17α-methyl-17β-hydroxy-androstane-[2,3]-cyclohex-4'-en3'-one.

*Example VI*

In accordance with the method of Example II, 2-hydroxymethylene-17α-methyl-testosterone was converted into 17α-methyl-17β-hydroxy-Δ⁴-androstene-[2,3]-cyclohex-4'-en-3'-one.

*Example VII*

In accordance with the methods of Examples I–III, the 17α-ethyl-, vinyl and ethinyl derivatives of 2-hydroxymethylene-dihydroallotestosterone and of 2-hydroxymethylene-testosterone were converted into the 17α-ethyl, vinyl and ethinyl derivatives of 17β-hydroxy-androstane-[2,3] - cyclohex - 4' - en - 3'-one and of 17β-hydroxy-Δ⁴-androstene-[2,3]-cyclohex-4'-en-3'-one.

*Example VIII*

In acordance with the method of Example I, 2-hydroxymethylene-17α-methyl-19-nor - dihydroallotestosterone was converted into 17α-methyl-17β-hydroxy-19-nor-androstane-[2,3]-cyclohex-4'-en-3'-one.

*Example IX*

In accordane with the method of Example II, 2-hydroxymethylene-19-nor-testosterone was transformed into 17β-hydroxy-19-nor-Δ⁴-androstene-[2,3] - cyclohex-4'-en-3'-one.

*Example X*

By substituting in the method of Example I, 3-penten-2-one for the methyl vinyl ketone, there was obtained by the method described in such example 17β-hydroxy-androstane-[2,3]-(1'-methyl)-cyclohex-4'-en-3'-one.

*Example XI*

In accordance with the method of Example I, 17α-methyl-dihydroallotestosterone was reacted with 1-hexen-3-one to afford 17α-methyl-17β-hydroxy-androstane-[2,3]-(4'-ethyl)-cyclohex-4'-en-3'-one.

*Example XII*

In accordance with the method of Example I, 2-hydroxymethylene-dihydroallotestosterone was reacted with 2-hexen-4-one to finally furnish 17β-hydroxy-androstane-[3,2]-(1',4'-dimethyl)-cyclohex-4'-en-3'-one.

*Example XIII*

1 g. of 17β-hydroxy-androstane-[2,3]-cyclohex-4'-en-3'-one, obtained in Example I, was treated with approximately 1 g. of acetic anhydride in 10 cc. of pyridine at room temperature. The mixture was maintained overnight at room temperature, poured into water, heated for one hour on the steam bath, cooled and the precipitate formed was collected, washed with water and dried. Crystallization from acetone-hexane afforded 17β-acetoxy-androstane-[2,3]-cyclohex-4'-en-3'-one.

When the acetic anhydride was substituted by propionic anhydride, there was formed the corresponding propionate.

When the acetic acid was substituted by cyclopentylpropionic anhydride or a long chain acid anhydride such as that of undecenoic acid, there was used twice the amount of the anhydride and the reaction time was doubled to afford the corresponding cyclopentylpropionate and undecenoate of 17β-hydroxy-androstane-[2,3]-cyclohex-4'-en-3'-one.

*Example XIV*

By substituting 17β-hydroxy-Δ⁴-androstene-[2,3]-cyclohex-4'-en-3'-one obtained in Example IV or 17β-hydroxy-19-nor-Δ⁴-androsten-[2,3]-cyclohex-4'-en-3'-one obtained in Example IX, or the products obtained in Examples X and XII, in the method of the preceding example there were obtained the corresponding acetate, propionate, cyclopentylpropionate and undecenoate of 17β-hydroxy-Δ⁴ - androstene-[2,3]-cyclohex-4'-en-3'-one, of 17β-hydroxy-19-nor-Δ⁴-androstene-[2,3]-cyclohex-4'-en-3' - one, of 17β-hydroxy-androstane-[2,3]-(1'-methyl)-cyclohex-4'-en-3'-one and of 17β-hydroxy-androstane-[3,2]-(1',4'-dimethyl)-cyclohex-4'-en-3'-one.

Example XV 1 g. of 17α-methyl-17β-hydroxy-androstane-[2,3]-cyclohex-4'-en-3'-one obtained in Example V, in 50 cc. of dry benzene was treated with 1 g. of acetic anhydride in the presence of 500 mg. of p-toluenesulfonic acid at room temperature for 24 hours, then washed successively with a 5% solution of aqueous sodium carbonate and with water, dried over anhydrous sodium sulfate. The solvent was evaporated and by recrystallization of the residue from acetone-hexane, there was obtained the 17α-methyl-17β-acetoxy-androstane-[2,3]-cyclohex-4'-en-3'-one.

When the acetic anhydride was replaced by propionic anhydride or propionic chloride, the corresponding propionate was obtained.

When undecenoic acid anhydride was substituted for the acetic anhydride, the amount of esterifying agent and the reaction time was increased to afford the 17-undecenoate of 17α-methyl-17β-hydroxy-androstane-[2,3]-cyclohex-4'-en-3'-one.

Example XVI

Wherein the preceding example, the 17α-methyl-17β-hydroxy-androstane-[2,3]-cyclohex-4'-en-3'-one was replaced by 17α-ethinyl-17β-hydroxy-Δ⁴-androstene-[2,3]-cyclohex-4'-en-3'-one, obtained in accordance with the method described in Example II, there is obtained the corresponding acetate, propionate and undecenoate of the latter compound.

Example XVII

By following the method of Example XV, the corresponding 17-acetate, 17-propionate and 17-undecenoate of 17α-methyl-17β-hydroxy-Δ⁴-androstene-[2,3]-cyclohex-4'-en-3'-one; 17α-ethyl-17β-hydroxy-androstane-[2,3]-cyclohex-4'-en-3'-one; 17α-vinyl-17β-hydroxy-androstane-[2,3]-cyclohex-4'-en-3'-one; 17α-ethinyl-17β-hydroxy-androstane-[2,3]-cyclohex-4'-en-3'-one; 17α-ethyl-17β-hydroxy-Δ⁴-androstene-[2,3]-cyclohex-4'-en-3'-one; 17α-vinyl-17β-hydroxy-Δ⁴-androstene-[2,3]-cyclohex-4'-en-3'-one; 17α-methyl-17β-hydroxy-19-nor-androstane-[2,3]-cyclohex-4'-en-3'-one and 17α-methyl-17β-hydroxy-androstane-[2,3]-(4'-ethyl)-cyclohex-4'-en-3'-one were prepared.

Example XVIII

In other experiments, the esterification of the products produced in Examples I through XII was conducted with other hydrocarbon carboxylic acid anhydrides containing up to 12 carbon atoms to produce the corresponding butyrates, enanthates and benzoates.

I claim:

1. A compound of the following formula:

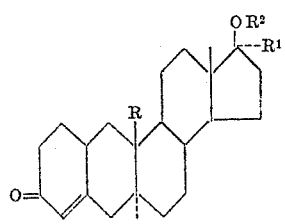

wherein R is selected from the group consisting of hydrogen and methyl; R' represents an unsaturated aliphatic hydrocarbon group containing up to 8 carbon atoms; and R² is selected from the group consisting of hydrogen and a hydrocarbon carboxylic acyl group of less than 12 carbon atoms.

2. 17α-vinyl-17β-hydroxy-androstane-[2,3]-cyclohex-4'-en-3'-one.

3. 17α-ethinyl-17β-hydroxy-androstane-[2,3]-cyclohex-4'-en-3'-one.

4. 17α-methyl-17β-hydroxy-19-nor-androstane-[2,3]-cyclohex-4'-en-3'-one.

5. A compound of the following formula:

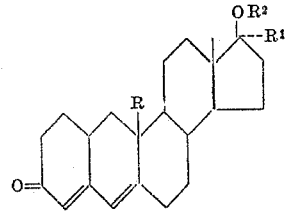

wherein R is selected from the group consisting of hydrogen and methyl; R' represents an unsaturated aliphatic hydrocarbon group containing up to 8 carbon atoms; and R² is selected from the group consisting of hydrogen and a hydrocarbon carboxylic acyl group of less than 12 carbon atoms.

6. 17α-vinyl-17β-hydroxy-Δ⁴-androstene-[2,3]-cyclohex-4'-en-3'-one.

7. 17α-ethinyl-17β-hydroxy-Δ⁴-androstene-[2,3]-cyclohex-4'en-3'one.

8. A compound of the following formula:

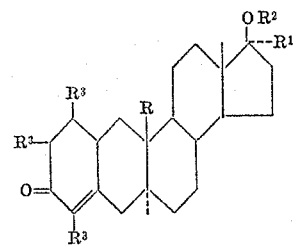

wherein R is selected from the group consisting of hydrogen and methyl; R' is selected from the group consisting of hydrogen and an unsaturated aliphatic hydrocarbon group containing up to 8 carbon atoms; R² is selected from the group consisting of hydrogen and a hydrocarbon carboxylic acyl group of less than 12 carbon atoms; and R³ is selected from the group consisting of hydrogen and lower alkyl and at least one R³ is lower alkyl.

References Cited in the file of this patent
UNITED STATES PATENTS
2,939,866    Atwater _____ June 7, 1960